United States Patent

Gundlach et al.

[11] Patent Number: 6,039,793
[45] Date of Patent: Mar. 21, 2000

[54] INKS FOR INK JET PRINTING WITH REDUCED INTERCOLOR BLEED

[75] Inventors: Kurt B. Gundlach; Luis A. Sanchez, both of Fairport; Richard L. Colt; Maura A. Sweeney, both of Rochester, all of N.Y.

[73] Assignee: Xerox Corporation, Stamford, Conn.

[21] Appl. No.: 09/105,606

[22] Filed: Jun. 26, 1998

[51] Int. Cl.[7] .................................................. C09D 11/02
[52] U.S. Cl. .................................... 106/31.28; 106/31.43; 106/31.47; 106/31.58; 106/31.6; 106/31.75; 106/31.77; 106/31.86; 106/31.87
[58] Field of Search .............................. 106/31.28, 31.43, 106/31.47, 31.58, 31.6, 31.75, 31.77, 31.86, 31.87

[56] References Cited

U.S. PATENT DOCUMENTS

| | | | |
|---|---|---|---|
| 5,106,416 | 4/1992 | Moffatt et al. | 106/31.58 |
| 5,108,504 | 4/1992 | Johnson et al. | 106/31.37 |
| 5,116,409 | 5/1992 | Moffatt | 106/31.43 |
| 5,401,303 | 3/1995 | Stoffel et al. | 106/31.43 |
| 5,428,383 | 6/1995 | Shields et al. | 347/96 |
| 5,488,402 | 1/1996 | Shields et al. | 347/96 |
| 5,518,534 | 5/1996 | Pearlstine et al. | 106/31.6 |
| 5,540,765 | 7/1996 | Gundlach et al. | 106/31.43 |
| 5,563,644 | 10/1996 | Isganitis et al. | 347/102 |
| 5,679,143 | 10/1997 | Looman | 106/31.27 |
| 5,750,594 | 5/1998 | Page et al. | 106/31.86 |
| 5,772,742 | 6/1998 | Wang | 106/31.58 |
| 5,785,743 | 7/1998 | Adamic et al. | 106/31.58 |
| 5,911,815 | 6/1999 | Yamamoto et al. | 106/31.43 |

Primary Examiner—Helene Klemanski
Attorney, Agent, or Firm—Judith L. Byorick

[57] ABSTRACT

Disclosed is a set of inks for generating multicolored images which comprises (a) a first ink having a first color, said first ink comprising water, a colorant, and a monomeric zwitterionic compound, said first ink being substantially free of organic acids having no basic functional groups thereon; and (b) a second ink having a second color darker than the first color of the first ink, said second ink comprising water and a pigment; wherein intercolor bleed between the first ink and the second ink is reduced in visibility.

20 Claims, No Drawings

INKS FOR INK JET PRINTING WITH REDUCED INTERCOLOR BLEED

BACKGROUND OF THE INVENTION

The present invention is directed to inks and to methods for the use thereof. More specifically, the present invention is directed to ink sets for use in ink jet printing processes, wherein intercolor bleed between the inks is reduced. One embodiment of the present invention is directed to a set of inks for generating multicolored images which comprises (a) a first ink having a first color, said first ink comprising water, a colorant, and a monomeric zwitterionic compound, said first ink being substantially free of organic acids having no basic functional groups thereon; and (b) a second ink having a second color darker than the first color of the first ink, said second ink comprising water and a pigment; wherein intercolor bleed between the first ink and the second ink is reduced in visibility. Another embodiment of the present invention is directed to a process for generating multicolored images on a recording sheet which comprises (a) providing a first ink having a first color, said first ink comprising water, a colorant, and a monomeric zwitterionic compound, said first ink being substantially free of organic acids having no basic functional groups thereon; (b) providing a second ink having a second color darker than the first color of the first ink, said second ink comprising water and a pigment; (c) applying the first ink to the recording sheet; and (d) after step (c), applying the second ink to the recording sheet; wherein the first ink is in contact with the second ink on the recording sheet, and wherein intercolor bleed between the first ink and the second ink is reduced in visibility.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM Technical Disclosure Bulletin, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

U.S. Pat. No. 5,563,644 (Isganitis et al.), the disclosure of which is totally incorporated herein by reference, discloses a printing process which comprises applying in imagewise fashion to a substrate an ink composition which comprises an aqueous liquid vehicle, a colorant, and a drying component selected from the group consisting of zwitterionic compounds, and subsequently exposing the substrate to microwave radiation, thereby drying the images on the substrate. In a preferred embodiment, the invention is directed to a thermal ink jet printing process which comprises (1) incorporating into a thermal ink jet printing apparatus an ink composition which comprises an aqueous liquid vehicle, a colorant, and a drying component selected from the group consisting of zwitterionic compounds; (2) heating the ink in an imagewise pattern to cause bubbles to form therein, thereby causing droplets of the ink to be ejected in an imagewise pattern onto a substrate, thereby generating images on the substrate; and (3) exposing the substrate to microwave radiation, thereby drying the images on the substrate.

U.S. Pat. No. 5,428,383 (Shields et al.) and U.S. Pat. No. 5,488,402 (Shields et al.), the disclosures of each of which are totally incorporated herein by reference, disclose a method for controlling color bleed in multicolor thermal ink jet printing systems. Color bleed involves the migration of coloring agents between adjacent zones in a multicolor printed image on a substrate. To control color bleed between any two ink compositions in a multi-ink system, at least one of the ink compositions will contain a precipitating agent (such as a multivalent metal salt). The precipitating agent is designed to react with the coloring agent in the other ink composition of concern. As a result, when the two ink compositions come in contact, a precipitate is formed from the coloring agent in the other ink composition which prevents migration thereof and color bleed problems. This technique is applicable to printing systems containing two or more ink compositions, and enables distinct multicolor images to be produced without the problems normally caused by color bleed.

U.S. Pat. No. 5,518,534 (Pearlstine et al.), the disclosure of which is totally incorporated herein by reference, discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C.

U.S. Pat. No. 5,679,143 (Looman), the disclosure of which is totally incorporated herein by reference, discloses a pH adjusting organic compound having both at least one acid functional group and at least one basic functional group which is employed along with an organic acid having no basic functional groups in a first ink jet ink composition to reduce the pH differential required to render insoluble the pH-sensitive colorant of a second encroaching ink jet ink composition. By inducing the precipitation of the pH-sensitive colorant, migration of the colorant is inhibited, thereby substantially reducing bleed between the pH-sensitive ink and the ink containing the organic acid (the "target" ink). By employing an organic acid, a pH differential on the order of only 3 to 5 units may be required. Aside from increasing the pH of the ink to desirable levels, the pH adjusting organic compound enhances bleed control by increasing the concentration of acid functional groups beyond the amount provided by the organic acid component. The organic acid component is employed at a concentration ranging from about 0.1 to 20 weight percent, and may be represented by such acids as polyacrylic, acetic, glycolic, malonic, malic, maleic, ascorbic, succinic, glutaric, fumaric, citric, tartaric, lactic, sulfonic, and orthophosphoric acid and derivatives thereof. The pH adjusting organic compound is employed in sufficient amount (about 0.1 to 20 weight percent) to achieve the desired pH differential and typically comprises an amino acid.

While known compositions and processes are suitable for their intended purposes, a need remains for improved ink compositions for ink jet printing. In addition, a need remains for ink compositions which exhibit reduced intercolor bleed when printed adjacent to each other or on top of each other. Further, a need remains for ink compositions which exhibit reduced edge raggedness and MFLEN, particularly when printed on plain paper. Additionally, a need remains for ink compositions which exhibit improved jetting performance in ink jet printing processes. There is also a need for ink compositions which exhibit good latency and recoverability characteristics in ink jet printing processes.

SUMMARY OF THE INVENTION

It is an object of the present invention to provide ink compositions with the above noted advantages.

It is another object of the present invention to provide improved ink compositions for ink jet printing.

It is yet another object of the present invention to provide ink compositions which exhibit reduced intercolor bleed when printed adjacent to each other or on top of each other.

It is still another object of the present invention to provide ink compositions which exhibit reduced edge raggedness and MFLEN, particularly when printed on plain paper.

Another object of the present invention is to provide ink compositions which exhibit improved jetting performance in ink jet printing processes.

Yet another object of the present invention is to provide ink compositions which exhibit good latency and recoverability characteristics in ink jet printing processes.

These and other objects of the present invention (or specific embodiments thereof) can be achieved by providing a set of inks for generating multicolored images which comprises (a) a first ink having a first color, said first ink comprising water, a colorant, and a monomeric zwitterionic compound, said first ink being substantially free of organic acids having no basic functional groups thereon; and (b) a second ink having a second color darker than the first color of the first ink, said second ink comprising water and a pigment; wherein intercolor bleed between the first ink and the second ink is reduced in visibility. Another embodiment of the present invention is directed to a process for generating multicolored images on a recording sheet which comprises (a) providing a first ink having a first color, said first ink comprising water, a colorant, and a monomeric zwitterionic compound, said first ink being substantially free of organic acids having no basic functional groups thereon; (b) providing a second ink having a second color darker than the first color of the first ink, said second ink comprising water and a pigment; (c) applying the first ink to the recording sheet; and (d) after step (c), applying the second ink to the recording sheet; wherein the first ink is in contact with the second ink on the recording sheet, and wherein intercolor bleed between the first ink and the second ink is reduced in visibility.

DETAILED DESCRIPTION OF THE INVENTION

The first and second inks of the present invention contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

In one preferred embodiment, the first ink contains a polar cosolvent in a relatively high concentration, typically from about 10 to about 60 percent by weight of the ink, preferably from about 10 to about 40 percent by weight of the ink, and more preferably from about 10 to about 35 percent by weight of the ink, although the amount can be outside of these ranges. Preferred polar solvents typically have dipole moments of from about 2 to about 5 debyes, and preferably from about 2.5 to about 4.5 debyes, although the dipole moment can be outside of these ranges. Examples of preferred polar cosolvents include ethylene glycol, propylene glycol, sulfolane, dimethyl sulfoxide, 2-pyrrolidinone, N-methyl pyrrolidinone, formamide, urea, dimethyl sulfone, acetamide, and the like, as well as mixtures thereof. In this embodiment, the ink also contains a penetrant in a relatively low concentration, typically from about 0.5 to about 10 percent by weight of the ink, preferably from about 1 to about 8 percent by weight of the ink, and more preferably from about 1 to about 6 percent by weight of the ink, although the amount can be outside of these ranges. Examples of preferred penetrants include tripropylene glycol monomethyl ether (such as DOWANOL® TPM), butyl carbitol, n-octylpyrrolidinone, cellusolve, cyclohexylpyrrolidinone, and the like, as well as mixtures thereof.

The inks for the present invention also contain a colorant. The colorant for the first ink can be either a dye or a pigment. The colorant for the second ink is a pigment. Any suitable or desired dye can be employed in the first ink, including anionic dyes, cationic dyes, nonionic dyes, zwitterionic dyes, and the like. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1 -G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Sevron Blue 5GMF (ICI); various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments for the first and second inks of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, Cl Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black,® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-1 11-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Additional examples of suitable hydrophilic pigment particles include the colored silica particles prepared as disclosed in, for example, U.S. Pat. No. 4,877,451 and U.S. Pat. No. 5,378,574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

In one embodiment, the pigment particles are present in combination with a resin emulsion, wherein the resin emulsion acts as a dispersing agent for the pigment particles. The resin emulsion typically comprises resin particles and solubilized resin derived from the polymerization in water of an olefinic acid, such as acrylic acid or methacrylic acid, and an olefinic acrylate or methacrylate, such as methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate, dodecyl acrylate, dodecyl methacrylate, benzyl acrylate, benzyl methacrylate, polyethyleneglycol acrylate, polyethyleneglycol methacrylate, polyoxyalkylene acrylate, polyoxyalkylene methacrylate, or the like. Typical polyoxyalkylene acrylates and methacrylates include those of the general formula

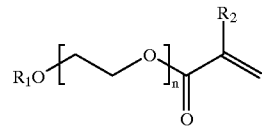

wherein R is a hydrogen atom or an alkyl group, typically with from 1 to about 6 carbon atoms, and n is a number representing the number of repeat monomer units, typically being from 2 to about 100.

The resin typically has a number average molecular weight of from about 1,000 to about 15,000 grams per mole and a weight average molecular weight of from about 1,500 to about 40,000, although the molecular weight values can be outside of these ranges. The resin particles typically have an average particle diameter of from about 30 to about 300 nanometers, although the average particle diameter can be outside of this range. The resin emulsion typically comprises from about 60 to about 99 percent by weight resin particles and from about 1 to about 40 percent by weight solubilized resin, and preferably comprises from about 90 to about 97 percent by weight resin particles and from about 3 to about 10 percent by weight solubilized resin, although the relative amounts can be outside of these ranges. Both the resin particles and the solubilized resin can be generated from a free radical type process in water, wherein one of the monomers is water soluble, such as an acrylic acid or a methacrylic acid, and the other monomer(s) exhibit low solubility in water (for example, from about 0.05 to about 2 percent by weight soluble in water), such as an alkyl acrylate or an alkyl methacrylate or a polyoxyalkylene(meth) acrylate.

The free radical initiator is generally an emulsion type initiator, such as a persulfate, like potassium or ammonium persulfate. Chain transfer agents can be used to adjust the molecular weight of the resin and to adjust the resin particle to solubilized resin ratio. Suitable chain transfer agents include alkylthiols, such as dodecanethiol, halogenated hydrocarbons, such as carbon tetrabromide, or, preferably, a combination of an alkylthiol and a halogenated hydrocarbon. Surfactants can also be incorporated into the resin emulsion, including anionic, cationic, and nonionic surfactants. Examples of suitable surfactants include sodium dodecylbenzene sulfonate, polyethylene oxide, polyethylene oxide nonyl phenyl ether, tetraalkyl ammonium chloride, sodium naphthalene sulfonate, and the like, typically present in an amount of from about 0.005 to about 20 weight percent of the resin, and preferably from about 0.1 to about 5 percent by weight of the resin, although the amount can be outside of these ranges. Generally, the olefinic acidic monomer comprises from about 5 to about 20 parts by weight of the resins, the olefinic alkyl(meth)acrylate comprises from about 40 to about 60 parts by weight of the resins, and the polyethyleneglycol methacrylate, or, more generally, a low molecular weight polyethylene glycol capped with a methacrylate or acrylate, comprises from about 0 to about 20 parts by weight of the resins. Although both the resin particles and the solubilized resin are derived from the same monomers, the monomer content may be different in the resin particles as compared to the solubilized resin; more specifically, the solubilized resin may contain a higher content of acidic monomer than the resin particles.

Further information regarding resin emulsions suitable for dispersing pigment colorants is disclosed in, for example, U.S. Pat. No. 5,766,818; copending application U.S. Ser. No. 08/869,962, filed Jun. 5, 1997, entitled "Ink Compositions," with the named inventors Guerino G. Sacripante, Garland J. Nichols, Elizabeth A. Kneisel, and Chieh-Min Cheng; copending application U.S. Ser. No. 08/828,850, filed Mar. 31, 1997, entitled "Ink Compositions," with the named inventors Garland J. Nichols, Daniel G. Marsh, and Chieh-Min Cheng; and copending application U.S. Ser. No. 08/960,754, filed Oct. 29, 1997, entitled "Surfactants," with the named inventors Nan-Xing Hu, Paul F. Smith, and Beng S. Ong; the disclosures of each of which are totally incorporated herein by reference.

The first ink also contains a monomeric zwitteronic compound (i.e., an ionic compound carrying both a positive charge and a negative charge in aqueous solutions). Examples of suitable zwitterionic compounds include α-amino acids, including substituted α-amino acids and α-amino acid salts, such as arginine, aspartic acid, alanine, cysteine, cystine, glutamic acid, glutamine, glycine, histidine, hydroxylysine, hydroxyproline, isoleucine, leucine, lysine, methionine, proline, serine, threonine, tyrosine, valine, and the like, β-amino acids, including substituted β-amino acids and β-amino acid salts, such as β-alanine, sarcosine, and the like, other amino acids, such as 4-aminobutyric acid, 6-aminocaproic acid, and the like, betaine, of the formula

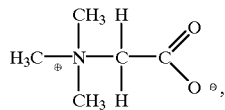

substituted betaines, such as 1-(3-sulfopropyl) pyridinium betaine, 1-(2-hydroxy-3-sulfopropyl) pyridinium betaine, and the like, as well as mixtures thereof. The monomeric zwitteronic compound is present in the ink in any desired or effective amount, typically from about 1 to about 60 percent by weight of the ink, preferably from about 5 to about 25 percent by weight of the ink, and more preferably from about 15 to about 20 percent by weight of the ink, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

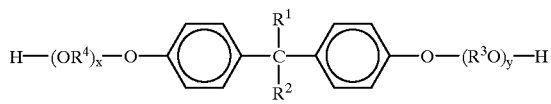

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.,* C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in thermal ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, particularly for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8.5, although the pH can be outside of these ranges.

The first ink for the present invention preferably has a surface tension of greater than about 35 dynes per centimeter, and preferably greater than about 40 dynes per centimeter, and preferably has a surface tension of less than about 50 dynes per centimeter, although the surface tension can be outside of this range. The second ink for the present invention preferably has a surface tension of greater than about 30 dynes per centimeter, and preferably greater than about 35 dynes per centimeter, and preferably has a surface tension of less than about 50 dynes per centimeter, although the surface tension can be outside of this range.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The first ink of the present invention is substantially free of organic acids having no basic functional groups thereon (i.e., non-zwitterionic organic acids). Inorganic acids, however, can be present in the ink if desired.

While not being limited to any particular theory, it is believed that the presence of the monomeric zwitterionic material in the first ink prevents intercolor bleed between the first ink and the second ink. It is not believed that this intercolor bleed repression occurs as a result of precipitation, destabilization, or reduced dispersability of any component (such as the colorant) of the second ink by any component of the first ink, or vice versa. When the first ink and the second ink are admixed in equal amounts to form a single liquid, no precipitation of either colorant is observed, and a stable dispersion results. It is believed that the presence of the monomeric zwitterionic material in first ink adjusts the osmotic gradient between the two inks, so that the first ink, having a lower osmotic pressure, flows into the second ink (having a higher osmotic pressure). Preferably, the first ink is of a lighter color than the second ink. Accordingly, when the first ink flows into the second ink, bleed is less visible than it otherwise would be if the second ink, being darker in color, flowed into the first ink.

The inks can be printed in any desired order; more specifically, the first ink can be applied to the recording sheet first, followed by applying the second ink to the recording sheet so that at least some of the second ink is in contact with the first ink on the recording sheet, or the second ink can be applied to the recording sheet first, followed by applying the first ink to the recording sheet so that at least some of the first ink is in contact with the second ink on the recording sheet.

The present invention is also directed to a process which entails incorporating the first ink of the present invention into an ink jet printing apparatus, incorporating the second ink of the present invention into an ink jet printing apparatus, and causing droplets of the first ink and droplets of the second ink to be ejected in an imagewise pattern onto a recording sheet, wherein the first ink is in contact with the second ink on the recording sheet, and wherein intercolor bleed between the first ink and the second ink is reduced. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the printing apparatus employs an acoustic ink jet process, wherein droplets of the ink are caused to be ejected in imagewise pattern by acoustic beams. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared by simple mixing of the following ingredients:

| Ingredient | Supplier | Amount (grams) |
|---|---|---|
| deionized water | — | 9.4 |
| imidazole | American Biorganics | 1 |
| EDTA | Aldrich Chemical Co. | 0.05 |
| polyethylene oxide* | Polysciences | 0.05 |
| DOWICIL 150/200 | Dow Chemical Co. | 0.1 |
| formamide | Aldrich Chemical Co. | 35 |
| PROJET YELLOW OAM** | Zeneca Colors | 34.4 |
| betaine | Finnsugar Bioproducts | 15 |
| DOWANOL TPM | Dow Chemical Co. | 5 |
| | roll mill 30 minutes | |

*bisphenol-A derivative, molecular weight 18,500, of the formula

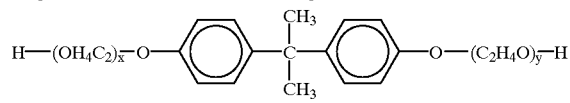

**aqueous solution containing 7.5 wt. % Acid Yellow 23 dye

The ink was filtered through a 0.2 micron, 142 millimeter Gelman Nylaflow filter at 40 pounds per square inch. The resulting ink exhibited a viscosity of 2.67 centipoise at 25° C., a pH of 8.69 at 25° C., a surface tension of 46 dynes per centimeter, and a conductivity of 4.22 millimhos.

EXAMPLE II

An ink composition was prepared by simple mixing of the following ingredients:

| Ingredient | Supplier | Amount (grams) |
|---|---|---|
| deionized water | — | 2.82 |
| tris(hydroxymethyl) aminomethane | American Biorganics | 0.3 |
| EDTA | Aldrich Chemical Co. | 0.15 |
| polyethylene oxide* | Polysciences | 0.03 |
| DOWICIL 150/200 | Dow Chemical Co. | 0.06 |
| formamide | Aldrich Chemical Co. | 21 |
| PROJET YELLOW OAM** | Zeneca Colors | 20.64 |
| DOWANOL TPM | Dow Chemical Co. | 3 |
| sarcosine | Aldrich Chemical Co. | 12 |
| | roll mill 30 minutes | |

*bisphenol-A derivative, molecular weight 18,500, of the formula

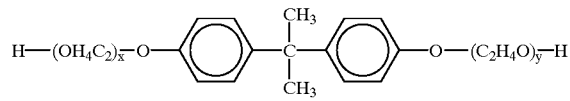

**aqueous solution containing 7.5 wt. % Acid Yellow 23 dye

The ink was filtered through a 0.2 micron, 47 millimeter Gelman Nylaflow filter at 40 pounds per square inch. The resulting ink exhibited a viscosity of 5.21 centipoise at 25° C., a pH of 7.7 at 25° C. a surface tension of 39.9 dynes per centimeter, and a conductivity of 2.86 millimhos.

EXAMPLE III

An ink composition was prepared by simple mixing of the following ingredients:

| Ingredient | Supplier | Amount (grams) |
| --- | --- | --- |
| deionized water | — | 2.82 |
| tris(hydroxymethyl) aminomethane | American Biorganics | 0.3 |
| EDTA | Aldrich Chemical Co. | 0.15 |
| polyethylene oxide* | Polysciences | 0.03 |
| DOWICIL 150/200 | Dow Chemical Co. | 0.06 |
| formamide | Aldrich Chemical Co. | 21 |
| PROJET YELLOW OAM** | Zeneca Colors | 20.64 |
| DOWANOL TPM | Dow Chemical Co. | 3 |
| β-alanine | Aldrich Chemical Co. roll mill 30 minutes | 12 |

*bisphenol-A derivative, molecular weight 18,500, of the formula

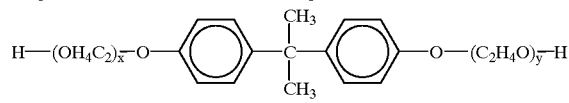

**aqueous solution containing 7.5 wt. % Acid Yellow 23 dye

The ink was filtered through a 0.2 micron, 47 millimeter Gelman Nylaflow filter at 40 pounds per square inch. The resulting ink exhibited a viscosity of 5.74 centipoise at 25° C., a pH of 8.15 at 25° C., a surface tension of 40.2 dynes per centimeter, and a conductivity of 2.87 millimhos.

EXAMPLE IV

An ink composition was prepared by simple mixing of the following ingredients:

| Ingredient | Supplier | Amount (grams) |
| --- | --- | --- |
| deionized water | — | 1.41 |
| tris(hydroxymethyl) aminomethane | American Biorganics | 0.15 |
| EDTA | Aldrich Chemical Co. | 0.075 |
| polyethylene oxide* | Polysciences | 0.015 |
| DOWICIL 150/200 | Dow Chemical Co. | 0.03 |
| formamide | Aldrich Chemical Co. | 10.5 |
| PROJET YELLOW OAM** | Zeneca Colors | 10.32 |
| DOWANOL TPM | Dow Chemical Co. | 1.5 |
| L-arginine hydrochloride | Aldrich Chemical Co. roll mill 30 minutes | 6 |

*bisphenol-A derivative, molecular weight 18,500, of the formula

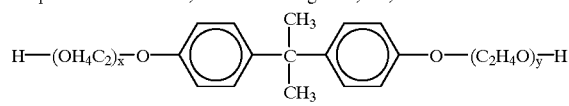

**aqueous solution containing 7.5 wt. % Acid Yellow 23 dye

The ink was filtered through a 0.2 micron, 47 millimeter Gelman Nylaflow filter at 40 pounds per square inch. The resulting ink exhibited a viscosity of 4.76 centipoise at 25° C., a pH of 7.52 at 25° C., a surface tension of 45.6 dynes per centimeter, and a conductivity of 19.12 millimhos.

EXAMPLE V

An ink composition was prepared by simple mixing of the following ingredients:

| Ingredient | Supplier | Amount (grams) |
| --- | --- | --- |
| deionized water | — | 2.82 |
| tris(hydroxymethyl) aminomethane | American Biorganics | 0.3 |
| EDTA | Aldrich Chemical Co. | 0.15 |
| polyethylene oxide* | Polysciences | 0.03 |
| DOWICIL 150/200 | Dow Chemical Co. | 0.06 |
| formamide | Aldrich Chemical Co. | 21 |
| PROJET YELLOW OAM** | Zeneca Colors | 20.64 |
| DOWANOL TPM | Dow Chemical Co. | 3 |
| D,L-aspartic acid | Aldrich Chemical Co. | 9 |
| ammonium hydroxide | Corco roll mill 30 minutes | 3 |

*bisphenol-A derivative, molecular weight 18,500, of the formula

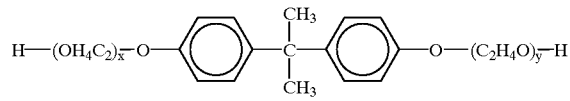

**aqueous solution containing 7.5 wt. % Acid Yellow 23 dye

The ink was filtered through a 1.2 micron/5 micron, 47 millimeter Gelman Nylaflow filter at 10 pounds per square inch. The resulting ink exhibited a viscosity of 4.76 centipoise at 25° C., a pH of 7.5 at 25° C., a surface tension of 39.6 dynes per centimeter, and a conductivity of 25.9 millimhos.

EXAMPLE VI

A resin emulsion comprising resins was derived from 23.6 percent by weight of methacrylic acid, 55.4 percent by weight of benzyl methacrylate, 21 percent by weight of polyethyleneglycol methacrylate ($M_w$=246), 3 percent by weight of dodecanethiol, and 1 percent by weight of carbon tetrabromide. A one liter kettle equipped with a mechanical stirrer was charged with 240 grams of water, 1.8 grams of sodium dodecylbenzene sulfonate (obtained from Rhone-Poulenc as Rhodacal Ds-10), and 2 grams of Triton X-100 (alkylphenoxypolyethanol, obtained from Aldrich Chemical Co.), and the mixture was stirred for 2 hours at about 100 rpm. To this solution were then added 1.8 grams of ammonium persulfate, followed by the addition of a mixture containing 28.3 grams of methacrylic acid, 66.5 grams of benzyl methacrylate, 25.2 grams of polyethyleneglycol methacrylate ($M_w$=246), 3.6 grams of dodecanethiol, and 1.2 grams of carbon tetrabromide. The mixture was heated to 80° C. for 6 hours. Thereafter, the resin emulsion was cooled to room temperature, and a sample (about 10 grams) was freeze dried and analyzed by GPC. The resin had a number average molecular weight of about 20,580 and a weight average molecular weight of about 8,193, with a polydispersity of 2.5.

An ink composition was then prepared containing 2.5 percent by weight of carbon black (CABOJET 300, obtained from Cabot Corp.), 23.2 percent by weight of sulfolane, 6 percent by weight of 2-pyrrolidinone, 0.05 percent by weight of polyethylene oxide ($M_w$=18,500, obtained from Polysciences), 4.24 percent by weight of the resin emulsion thus prepared, and deionized water. The polyethylene oxide was dissolved in water by simple agitation using a stir bar for about 5 minutes, followed by the addition of the sulfolane, 2-pyrrolidinone, and resin emulsion. The resulting mixture was then added to a stirring solution of the CABO-JET 300 carbon black. The resulting ink was stirred with a stir bar for about 5 to about 10 minutes, followed by filtration through a 1 micron Gelman glass fiber filter. The ink composition thus prepared had a viscosity of 2.19 centipoise at 25° C., a pH of 6.47 at 25° C., and a surface tension of 33 dynes per centimeter.

COMPARATIVE EXAMPLE

An ink composition was prepared by simple mixing of the following ingredients:

| Ingredient | Supplier | Amount (grams) |
|---|---|---|
| deionized water | — | 24.4 |
| imidazole | American Biorganics | 1 |
| EDTA | Aldrich Chemical Co. | 0.05 |
| polyethylene oxide* | Polysciences | 0.05 |
| DOWICIL 150/200 | Dow Chemical Co. | 0.1 |
| formamide | Aldrich Chemical Co. | 35 |
| PROJET YELLOW OAM** | Zeneca Colors | 34.4 |
| DOWANOL TPM | Dow Chemical Co. | 5 |
| | roll mill 30 minutes | |

*bisphenol-A derivative, molecular weight 18,500, of the formula

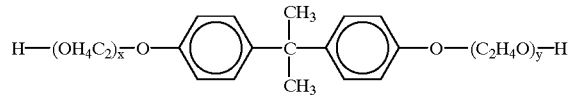

**aqueous solution containing 7.5 wt. % Acid Yellow 23 dye

The ink was filtered through a 0.2 micron, 142 millimeter Gelman Nylaflow filter at 40 pounds per square inch. The resulting ink exhibited a viscosity of 1.63 centipoise at 25° C., a pH of 8.69 at 25° C., a surface tension of 49.2 dynes per centimeter, and a conductivity of 6.44 millimhos.

EXAMPLE VII

The black ink of Example VI and the yellow inks of Examples I to V and the Comparative Example were incorporated into a Lexmark 7200 ink jet printer and black and yellow images were generated on XEROX® 4024 paper. The results for intercolor bleed (ICB) (measured as MFLEN or edge raggedness of the top and bottom of black lines printed on a yellow background, in microns) were as follows:

| zwitterionic compound | ICB top | ICB bottom |
|---|---|---|
| none (control) | 37 ± 10 | 41 ± 10 |
| betaine | 15 ± 10 | 11 ± 8 |
| sarcosine | 17 ± 8 | 19 ± 7 |
| β-alanine | 19 ± 7 | 17 ± 9 |
| L-arginine HCl | 20 ± 8 | 15 ± 7 |
| D,L-aspartic acid | 16 ± 8 | 19 ± 6 |

As the results indicate, intercolor bleed for the inks containing the zwitteronic compounds was substantially reduced compared to the control ink.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A set of inks for generating multicolored images which comprises (a) a first ink having a first color, said first ink comprising water, a colorant, and a monomeric zwitterionic compound which is an amino acid, a betaine, or a mixture thereof, said first ink being substantially free of organic acids having no basic functional groups thereon; and (b) a second ink having a second color darker than the first color of the first ink, said second ink comprising water and a pigment; wherein intercolor bleed between the first ink and the second ink is reduced in visibility.

2. A set of inks according to claim 1 wherein the colorant in the first ink is a dye.

3. A set of inks according to claim 1 wherein the colorant in the first ink is an anionic dye.

4. A set of inks according to claim 1 wherein the first ink further contains a polar cosolvent having a dipole moment of from about 2 to about 5 debyes in an amount of from about 10 to about 60 percent by weight of the ink.

5. A set of inks according to claim 4 wherein the cosolvent is selected from the group consisting of ethylene glycol, propylene glycol, sulfolane, dimethyl sulfoxide, 2-pyrrolidinone, N-methyl pyrrolidinone, formamide, urea, dimethyl sulfone, acetamide, and mixtures thereof.

6. A set of inks according to claim 1 wherein the first ink further contains a penetrant in an amount of from about 0.5 to about 10 percent by weight of the ink.

7. A set of inks according to claim 6 wherein the penetrant is selected from the group consisting of tripropylene glycol monomethyl ether, butyl carbitol, n-octylpyrrolidinone, cellusolve, cyclohexylpyrrolidinone, and mixtures thereof.

8. A set of inks according to claim 1 wherein the zwitterionic compound is an amino acid.

9. A set of inks according to claim 1 wherein the zwitterionic compound is selected from the group consisting of arginine, aspartic acid, alanine, cysteine, cystine, glutamic acid, glutamine, glycine, histidine, hydroxylysine, hydroxyproline, isoleucine, leucine, lysine, methionine, proline, serine, threonine, tyrosine, valine, β-alanine, sarcosine, 4-aminobutyric acid, 6-aminocaproic acid, betaine, 1-(3-sulfopropyl) pyridinium betaine, 1-(2-hydroxy-3-sulfopropyl) pyridinium betaine, and mixtures thereof.

10. A set of inks according to claim 1 wherein the zwitterionic compound is selected from the group consisting of betaine, sarcosine, arginine, aspartic acid, β-alanine, and mixtures thereof.

11. A set of inks according to claim 1 wherein the zwitterionic compound is present in the first ink in an amount of from about 1 to about 60 percent by weight of the ink.

12. A set of inks according to claim 1 wherein the first ink has a surface tension of greater than about 35 dynes per centimeter.

13. A process for generating multicolored images on a recording sheet which comprises (a) providing a first ink having a first color, said first ink comprising water, a colorant, and a monomeric zwitterionic compound which is an amino acid, a betaine, or a mixture thereof, said first ink being substantially free of organic acids having no basic functional groups thereon; (b) providing a second ink having a second color darker than the first color of the first ink, said second ink comprising water and a pigment; (c) applying the first ink to the recording sheet; and (d) after step (c), applying the second ink to the recording sheet; wherein the first ink is in contact with the second ink on the recording sheet, and wherein intercolor bleed between the first ink and the second ink is reduced in visibility.

14. A process according to claim 13 wherein the first ink and the second ink are incorporated into an ink jet printer and droplets of the first and second inks are caused to be ejected in an imagewise pattern onto the recording sheet.

15. A process according to claim 14 wherein the printer employs a thermal ink jet process wherein the ink in the nozzles is selectively heated in an imagewise pattern, thereby causing droplets of the ink to be ejected in imagewise pattern.

16. A process according to claim 14 wherein the printer employs an acoustic ink jet process, wherein droplets of the ink are caused to be ejected in imagewise pattern by acoustic beams.

17. A process according to claim 13 wherein the zwitterionic compound is an amino acid.

18. A process according to claim 13 wherein the zwitterionic compound is selected from the group consisting of arginine, aspartic acid, alanine, cysteine, cystine, glutamic acid, glutamine, glycine, histidine, hydroxylysine, hydroxyproline, isoleucine, leucine, lysine, methionine, proline, serine, threonine, tyrosine, valine, β-alanine, sarcosine, 4-aminobutyrc acid, 6-aminocaproic acid, betaine, 1-(3-sulfopropyl) pyridinium betaine, 1-(2-hydroxy-3-sulfopropyl) pyridinium betaine, and mixtures thereof.

19. A process according to claim 13 wherein the zwitterionic compound is selected from the group consisting of betaine, sarcosine, arginine, aspartic acid, β-alanine, and mixtures thereof.

20. A process according to claim 13 wherein the zwitterionic compound is present in the first ink in an amount of from about 1 to about 60 percent by weight of the ink.

* * * * *